UNITED STATES PATENT OFFICE.

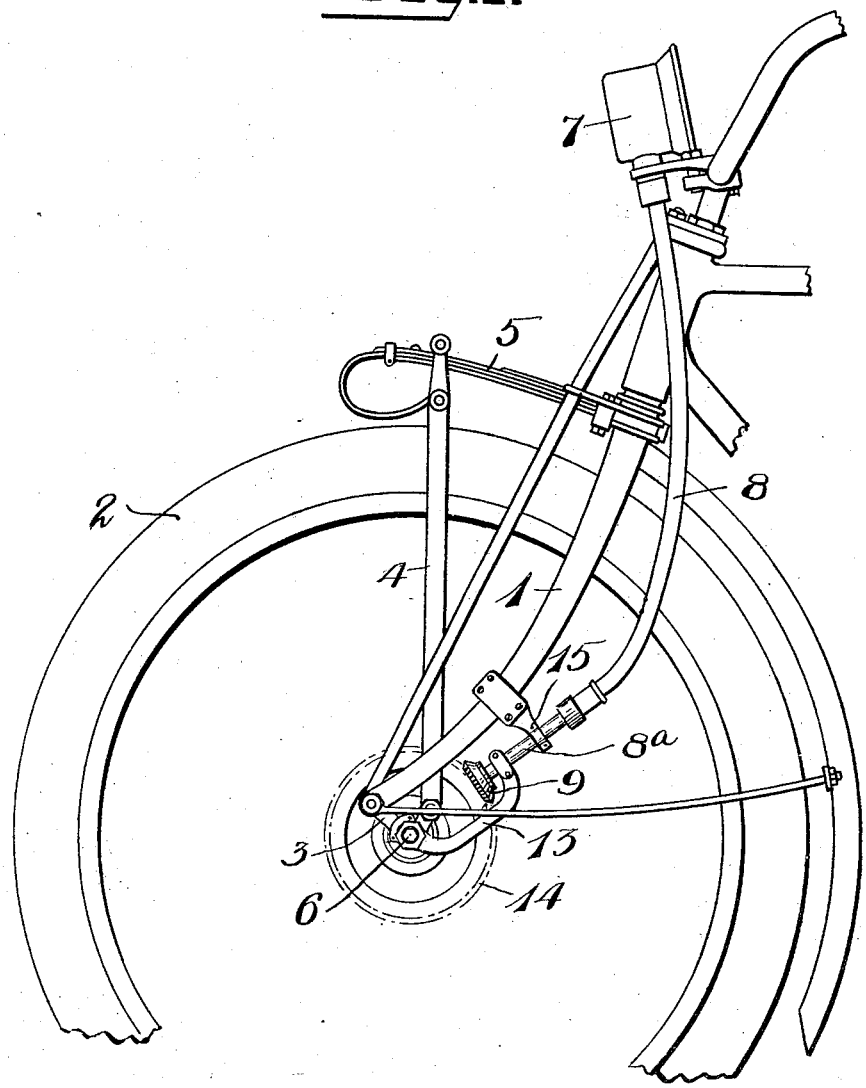

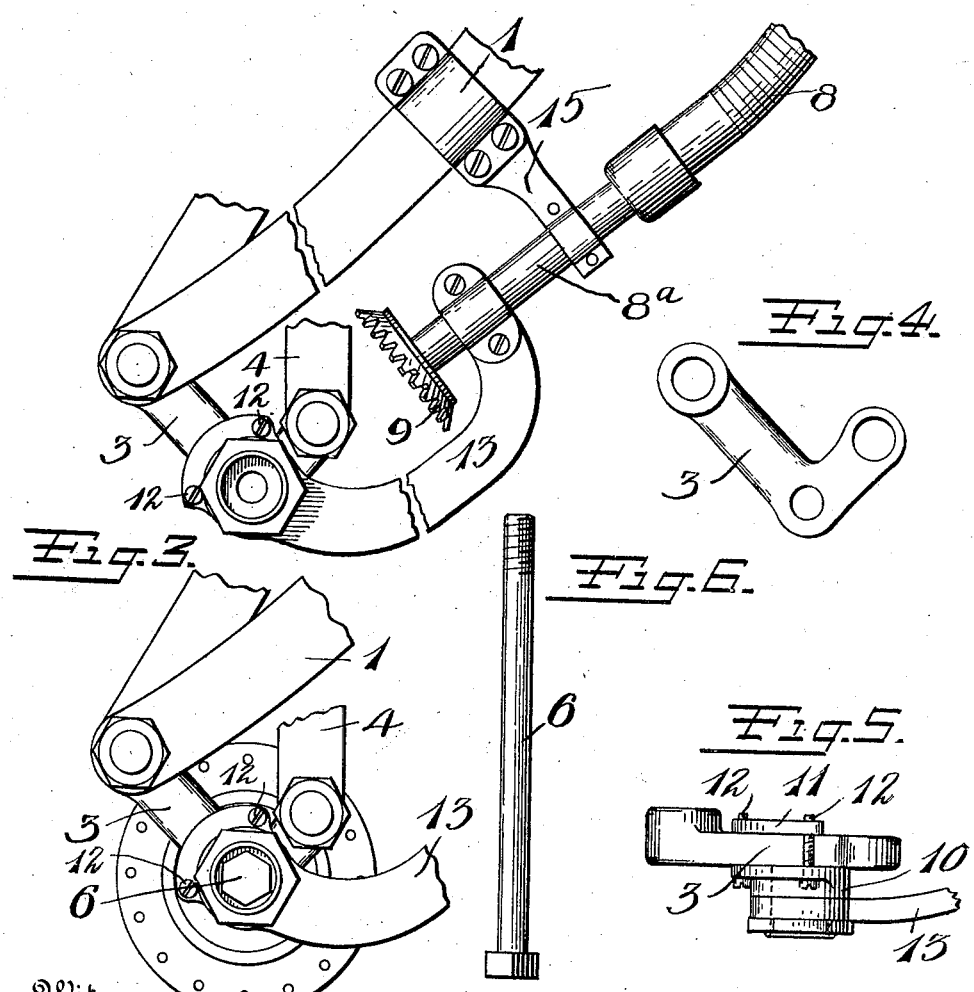

AUGUSTUS W. WESSOLECK, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

DRIVING-PINION SUPPORT.

1,074,581. Specification of Letters Patent. Patented Sept. 30, 1913.

Application filed January 15, 1913. Serial No. 742,199.

*To all whom it may concern:*

Be it known that I, AUGUSTUS W. WESSOLECK, a citizen of the United States, residing at New Britain, Hartford county, State of Connecticut, have invented certain new and useful Improvements in Driving-Pinion Supports, of which the following is a full, clear, and exact description.

My invention relates to an improved sup10 port or mounting for driven gears arranged to be associated with a driving gear mounted upon a yielding wheel, such as the front wheel of a bicycle having a spring fork. In such vehicles it is obvious that as the wheel moves up and down carrying with it the driving gear, the driven gear must be appropriately mounted so that it will preserve its proper meshed relation with the driving gear during the upward and down20 ward movement of the wheel.

It is the object of my invention to provide a simple and effective support for such driven gear which is so arranged that the wheel may be entirely removed without dis25 turbing its adjustment and mounting and so that when the wheel is replaced, the driving gear carried thereby will again properly mesh with the driven gear.

In the drawings: Figure 1 is a side eleva30 tion of the front part of a bicycle showing my invention as applied thereto. Fig. 2 is a relatively enlarged detail view the front wheel being removed. Fig. 3 is a similar view, the front wheel hub being shown in place. Figs. 4 to 6 are detail views.

1 represents the rigid part of the front fork of a bicycle.

2 represents the front axle of the wheel.

3 represents the yielding part of the front fork, the same usually being in the form of a bell-crank constituting an oscillating bracket, the wheel being connected to an intermediate part thereof. One end of the bracket 3 is pivoted to the rigid part 1, while the other end is pivoted to an upright 4 connected to a spring 5 carried by the hub of the rigid fork 1. The wheel 2 is connected in the usual manner to the bracket 3 by means of a removable axle 6.

The parts thus far described are such as are well-known and in common use.

7 represents a speedometer having a flexible shaft, the covering of which is indicated at 8.

9 is a driven gear which is connected to the flexible shaft and by which the speedometer mechanism is actuated.

8ª is a sleeve at the end of the covering 8 of the flexible shafting, said sleeve being so associated with the gear 9 that the driven gear cannot have substantial longitudinal movement independently thereof.

10 is a bearing, in this instance in the form of a sleeve which is provided with a suitable clamping plate 11 at one side thereof and clamping screws or bolts 12—12 by which said bearing 10 may be rigidly clamped to the bracket 3. The passage through the bearing sleeve 10 is sufficiently large to permit the axle 6 of the front wheel to be freely passed through so that the head of the axle will engage against the bracket 3 in the usual manner for the purpose of holding the wheel in place, the bearing sleeve being entirely independent of said axle.

11 is a goose-neck arm mounted to oscillate on the bearing sleeve 10 and provided with a clamp or other suitable connection at its free end to hold the sleeve portion 8ª and, therefore, the gear 9, at a proper spaced relation relatively to the axis of the front wheel.

14 is a driving gear carried concentrically by the front wheel and with which the gear 9 should properly mesh at all times. To secure the proper meshing of said gears the sleeve 8ª may be properly adjusted in the clamping end of the goose-neck arm 13. When this is done, it follows that the arm 13 may oscillate freely on the bracket 3 without disturbing the proper meshed relation of said gears 9 and 14. I also preferably provide a guide 15 which is carried by the fork 1 and is so associated with the sleeve 8ª that it may freely slide to and fro in said guide as the wheel moves up and down relatively to the rigid fork 1. The guide 15 serves to take some of the side strain off the goose-neck arm 13 occasioned by the pressure of the driving gear 14 against the pinion 9.

From the foregoing it is apparent that the driven gear mounting is wholly independent of the front wheel and when once adjusted, preserves its proper position relatively to the axis thereof whether the wheel is present or absent. By reason of this fact, it follows that the front wheel may be removed at any time for repair, since the axle 6, being entirely free and independent of the gear mounting, may be removed, whereupon the front wheel 2 can be taken out, the gear mounting preserving the position shown in Fig. 2. When the wheel is replaced and the axle inserted, the driving gear 14 will properly mesh with the driven gear 9 without further adjustment.

I am aware that an oscillating concentric mounting or support for driven gears associated with driving gears is very old and well-known and I, therefore, lay no claim to this feature, my invention consisting in a particular means by which said mounting is secured and by which substantial advantages are attained, notably the advantage of being able to remove the front wheel without disturbing in the slightest the adjustment of the gear-support or the driven gear.

What I claim is:

1. In combination, a yielding support for a wheel comprising an oscillating bracket supported at its ends, a support for said wheel in said bracket intermediate said ends and including an axle, with a driving gear carried by said wheel and a driven gear arranged to mesh with said driving gear, a support for said driven gear comprising an arm freely pivoted on said bracket concentrically with the front wheel and independent of the axle therefor.

2. In combination, a yielding support for a wheel comprising an oscillating bracket supported at its ends, a support for said wheel in said bracket intermediate said ends and including an axle, with a driving gear carried by said wheel and a driven gear arranged to mesh with said driving gear, a support for said driven gear comprising an arm freely pivoted on said bracket concentrically with the front wheel and independent of the axle therefor, said pivotal support comprising a sleeve, with means for detachably securing the same to said bracket, said sleeve being of sufficient internal diameter to permit the wheel axle to be passed freely therethrough.

AUGUSTUS W. WESSOLECK.

Witnesses:
E. E. MORSE,
FLORENCE G. HADLEY.

Copies of this patent may be obtained for five cents each, by addressing the "Commissioner of Patents, Washington, D. C."

It is hereby certified that in Letters Patent No. 1,074,581, granted September 30, 1913, upon the application of Augustus W. Wessoleck, of New Britain, Connecticut, for an improvement in "Driving-Pinion Supports," errors appear in the printed specification requiring correction as follows: Page 1, line 38, strike out the words "axle of the"; same page, line 42, before the word "wheel" insert the words *axle of the;* page 2, line 48, for the word "or" read *for;* and that the said Letters Patent should be read with these corrections therein that the same may conform to the record of the case in the Patent Office.

Signed and sealed this 14th day of October, A. D., 1913.

[SEAL.]

R. .T FRAZIER,

*Acting Commissioner of Patents.*